Figure 1:
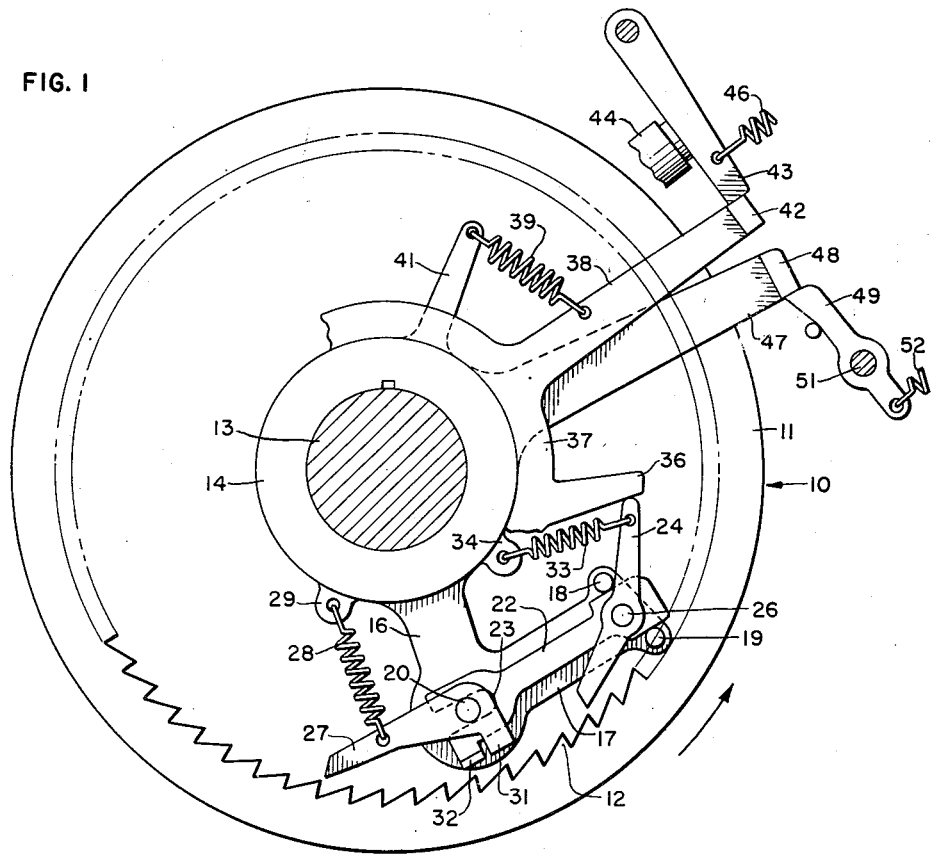

Nov. 17, 1953 W. J. ZENNER 2,659,467
POSITIVE ENGAGING CLUTCH
Filed Oct. 2, 1951

INVENTOR
WALTER J. ZENNER
BY Emery Robinson
ATTORNEY

Patented Nov. 17, 1953

2,659,467

UNITED STATES PATENT OFFICE 2,659,467

POSITIVE ENGAGING CLUTCH

Walter J. Zenner, Des Plaines, Ill., assignor to Teletype Corporation, Chicago, Ill., a corporation of Delaware Application October 2, 1951, Serial No. 249,284

14 Claims. (Cl. 192—28)

1

This invention relates to a positive engaging clutch and more particularly to an arrangement of clutch elements wherein the engagement of a first clutch element with a driving member moves a second clutch element into full engagement with the driving member.

In clutches utilized in start-stop telegraphy, it is of paramount importance that the clutch elements instantaneously engage and further that such engagement is maintained without subsequent slippage during the transmission or reception of telegraph signals. Heretofore, it has been the general practice to employ friction disc type clutches in telegraph apparatus. Positive engaging clutches do not readily adapt themselves to incorporation in telegraph apparatus because there is a tendency for existing clutches to slip during the initial portion of an engagement operation. This impediment is especially perceptible in clutches wherein a toothed engaging member is brought into engagement with a toothed driving member. In cases of high speed operation, an engagement of toothed clutch elements often results in the hanging up or retention of the toothed engaging member in the vicinity of the apex of a tooth on the driving member. This partial engagement of the toothed clutch members results in a severe strain being placed on the tips of the teeth ultimately causing said teeth to crack or chip due to excessive stress being applied to the tips of the teeth. It has also been observed that the occurrences of partially engaged clutch elements results in slippage between the clutch elements.

The present invention though described in relation to an application in start-stop telegraph apparatus is not to be construed as limited to such an application, since the clutch can be advantageously adapted to use in many other types of apparatus wherein it is desired to obtain an instantaneous clutching action without a subsequent slip or breakage of the engaging elements.

It is one of the primary objects of this invention to provide a positive engaging clutch wherein the clutch elements are instantaneously engaged without subsequent fracturing or chipping of the elemental parts.

It is a further object of this invention to provide a positive engaging clutch wherein the clutching action occurs instantaneously upon releasing of the clutch, and that said positive engagement continues during the subsequent transmission of power by the clutch.

Still another and more specific object of the invention is to provide a positive engaging clutch wherein a first toothed member is brought into engagement with a tooth on a toothed driving member to initiate the movement of a second toothed driven member into full engagement with another tooth on the driving member.

With these and other objects in view, the present invention contemplates a driving member in the form of a flanged disc having a plurality of teeth or serrations formed on the inner peripheral surface of the flanged portion of the disc. Positioned within the flanged portion of the disc and spaced therefrom is a portion of the driven member upon which is mounted the principal driven clutch elements. More specifically there is slidably mounted on the driven member an actuator link having pivotally mounted thereon a first single tooth pawl. Pivotally mounted on the driven member is a second single tooth pawl having a projecting arm adapted to be engaged by a detent on the actuator link. A suitable operating instrumentality is provided to maintain the position of the first single tooth pawl out of engagement with the teeth on the flanged driven member. Resilient means are connected to the second single toothed pawl to maintain this pawl out of engagement with the toothed driving member.

In operation of the clutch the instrumentality is actuated to release the first single tooth pawl whereby a spring urges the first pawl into engagement with a tooth on the flanged driving member. Immediately upon engagement of the first pawl with a tooth on the flanged driving member, the momentum of the driving member and the inertia of the driving member causes the actuator link to slide relative to the driven member to bring the detent into engagement with the projecting portion of the second single toothed pawl, whereupon the second pawl is pivoted against the effect of the resilient means into full engagement with another tooth on the flanged driving member.

Figure 2:
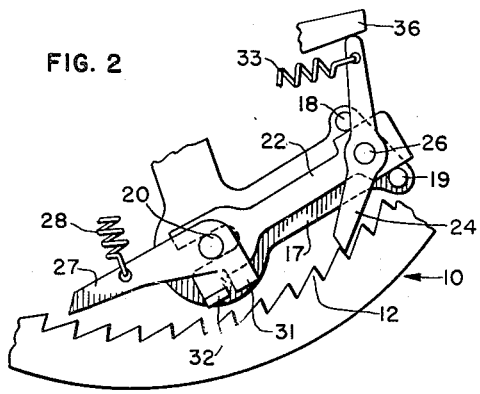
Figure 3:
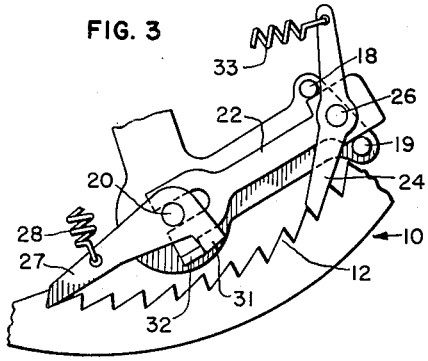

Other objects and advantages of the present invention will be apparent from the following detailed description when considered in conjunction with the accompanying drawing wherein:

Figure 1 is a front elevational view partially in section disclosing the arrangement of the principal elemental parts of the invention; and, Figures 2 and 3 are segmental views of a portion of the clutch shown in Figure 1 illustrating the positions of the engaging elements during two stages of a cycle of operation.

Referring to the drawing wherein like reference numerals designate identical elements in the three views and more particularly to Figure 1, a continuously rotating driving drum is designated by the reference numeral 10. Formed along the inner peripheral surface of the flanged portion 11 of the drum 10 are a plurality of evenly spaced teeth or serrations 12. Power for continuously driving the drum is usually supplied through the agency of an electric motor (not shown) but it is to be understood that any suitable source of rotative power may be utilized to rotate the drum.

Positioned within the flanged portion 11 of the drum 10 is one end of a driven shaft 13 upon which is secured a driven hub 14, and L-shaped projection 16 extends from the hub 14, and secured to a long leg 17 of the L-shaped projection 16 are a plurality of guide pins 18, 19 and 20. An actuator slide 22 having a recessed portion 23 is positioned on the long leg 17 so that the slide rides between the pins 18 and 19 and the recessed portion 23 straddles the pin 20. A first clutching pawl 24 is rotatably mounted on a stud 26 which is mounted on the actuator slide 22. A second clutching pawl 27 is rotatably mounted on the pin 20 secured to the projection 16. A spring 28 secured at one end to the pawl 27 and at its other end to an eye 29 formed integral with the hub 14 is provided and tends to urge the pawl 27 out of engagement with the teeth or serrations 12. Projecting from one end of the pawl 27 is a heel portion 31 which is adapted to be engaged by the movement of a detent 32 fixed to the actuator slide 22.

Normally urging the pawl 24 toward the teeth or serrations 12 is a tension spring 33 connected at one end to the pawl 24 and at its other end to an eye 34 integrally formed on the hub 14. Movement of the pawl 24 is prevented by a cam 36 which engages and holds the pawl in the disengaged position. The cam 36 is in reality an abutment projecting from a hub 37 rotatably mounted on the hub 14. An operating arm 38 integrally formed on the hub 37 is urged in a counterclockwise direction by a tension spring 39 interconnecting the operating arm 38 and an arm 41 fixed to and extending from the hub 14. Movement of the operating arm 38 is prevented by the engagement of a dog 42, forming part of the operating arm 38, with a pivotally mounted armature 43 controlled by a start-stop magnet 44. The armature 43 is urged away from the dog 42 by a spring 46, however such movement is normally prevented by maintaining the magnet 44 energized to overcome the effect of the spring 46.

Connected to the driven hub 14 is a holding arm 47 having a dog 48 formed thereon to extend beyond the periphery of the driving drum 10. Engaging the dog 48 is an anti-backlash latch 49 which is pivotally mounted on a pin 51 and is urged toward the engaged position by a spring 52.

Briefly reviewing the position of the elemental parts when the clutch is disengaged as illustrated in Figure 1, the first engaging pawl 24 is maintained in position against the effect of the extended tension spring 33 by the cam 36 and cam 36 is maintained in position by the armature 43 engaging the dog 42 to hold the operating arm 38 against the effect of the extended spring 39. The extended spring 39 tends to rotate the hubs 14 and 37 in opposite directions but this rotation is prevented by the engagement of the armature 43 and the latch with the dogs 42 and 48, respectively. The second engaging pawl 27 is maintained out of engagement with the teeth 12 by the spring 28. Consequently, the elemental parts of the driven portions of the clutch are maintained in the positions shown in Figure 1 until the magnet 44 is de-energized.

In order to effectuate a clutching operation when the drum 10 is rotating in a counterclockwise direction, the magnet 44 is de-energized by the reception of a no-current or spacing signal, whereupon, the magnet 44 releases the armature 43 to pivot out engagement with the dog 42 under the impetus of the spring 46. The operating arm 38 pivots in a counterclockwise direction about the hub 14 under the impetus of the extended spring 39 to move the cam 36 from engagement with the pawl 24. Extended spring 33 thereupon pivots the first engaging pawl 24 into engagement with a tooth 12 on the flanged portion 11 of the constantly rotating driving drum 10 as shown in Figure 2. When the pawl 24 engages a tooth 12, the momentum of the drum is imparted to the pawl 24 whereby the pawl and the actuator slide 22 connected thereto move relative to the remainder of the driven portions of the clutch which are temporarily held stationary due to the inertia of the driven elements. The pawl 24 is connected to the driven hub 14 through the instrumentality of the spring 33, hence, as the pawl 24 moves, the inertia of the remainder of the driven portion of the clutch is overcome, and said driven portions of the clutch are gradually brought up to the rotative speed of the rotating driving drum by the driving force transmitted through the extended spring 33.

Simultaneously with the initiation of movement of the pawl 24, the actuator slide 22 is moved to bring the detent 32 into engagement with the heel 31 of the second engaging pawl 27. Continued movement of the actuator slide 22 results in the detent 31 pivoting the second engaging pawl 27 against the effect of the contracted spring 28 and hence into the full depth of a space between a pair of adjacent teeth 12 on the flanged portion 11 of the driving drum 10. The instant that the pawl 27 is fully positioned within the full depth between the teeth 12, the face of a tooth 12 is brought into engagement with the face of the pawl 27 as shown in Figure 3. The train of driving power is now transferred from the first engaging pawl 24 to the second engaging pawl 27 and, since this pawl is pivotally mounted on the pin 20, secured to the L-shaped arm 16, the train of driving power now is directed through members rigidly secured to the driven shaft 13 causing all the driven elements to rotate at the same angular velocity as the driving drum 10.

In order to disengage the clutch, a current or marking signal is received by the magnet 44 to energize the magnet whereby the armature is attracted into position to engage the dog 42 as shown in Figure 1. This engagement instantly stops the movement of the operating arm 38, hence holding the cam 36 stationary. The momentum imparted to the other driven members is sufficient to force the pawl 24 against the cam 36 whereupon the pawl 24 is pivoted out of engagement with the engaged tooth 12 of the driving drum 10 to discontinue the driving connection between the drum 10 and the pawl 24. Since the other driven elements are not secured to the pawl 24, and the actuator slide 22, they continue to rotate, thus moving the pin 20 and pawl 27 relative to the now stationary actuator slide 22. Consequently, the heel 31 of the pawl 27 is moved from engagement with the detent 32 thereby allowing the extended spring 28 to move the second pawl 27 from full engagement with the previously engaged tooth 12 of the driving drum 10. The second pawl 27 continues to pivot under the impetus of the extended spring 28 until the unoperated position, shown in Figure 1, is again assumed.

The momentum imparted to the driven members is soon dissipated by extending the spring 39 which as previously indicated interconnects the now stationary operating arm 38 and the arm 41 connected to the driven hub 14. Sufficient momentum is imparted to the driven elements to carry the holding arm 47 and the dog 48 in a counterclockwise movement past the latch 49 to pivot the latch in a clockwise direction against the biasing effect of the spring 52. When the dog 48 passes the end of the latch 49, the extended spring 52 moves the latch into position to engage the dog 48, thereby preventing any retrograde movement of the driven members after the momentum of the driven members is overcome by the extension of the spring 39. It may be therefore appreciated that the driven elements are now returned to the unoperated position as illustrated in Figure 1 and are in condition to be again operated by the reception of another no-current or spacing impulse in the magnet 44.

It is to understood that the above described arrangements of apparatus and construction of clutch elements are simply illustrative of an application of the principles of the invention and many other modifications may be made without departing from the spirit and scope of the invention. This is readily apparent since the engaging unit heretofore described may be duplicated in order that a number of pawls be brought into simultaneous engagement with the toothed driving drums 10 to secure a greater number of driving connection between the driving and driven portions of the clutch.

What is claimed is:

1. In a positive engaging clutch, a multi-toothed driving member, a driven member, a first engaging means connected to the driven member, a second engaging means operatively connected to the first engaging means, and means for moving the first engaging means into engagement with a tooth of the driving member, whereby the driving member moves the first engaging means to move the second engaging means into full engagement with the face of another tooth on the driving member.

2. In a positive engaging clutch, a driving means, a driven means, a first engaging means movably mounted on the driven means, a second engaging means movably mounted on the driven means, means for moving the first engaging means into engagement with the driving means, means controlled by the inertia of the driven means and the momentum of the driving means for moving the first engaging means, and means controlled by the movement of the first engaging means for moving the second engaging means into engagement with the driving means.

3. In a positive engaging clutch, a driving member having a plurality of teeth formed thereon, a driven member, a first engaging member movably mounted on the driven member, a second engaging member movably mounted on the driven member, means for moving the first engaging member into engagement with a tooth on the driving member, and means controlled by the movement of the first engaging member for moving the second engaging member into engagement with another one of the teeth on the driving member.

4. In a positive engaging clutch, a multi-toothed driving member, a driven member, an actuator movably mounted on the driven member, a first engaging member movably mounted on the actuator, means for urging said engaging member into engagement with said toothed driving member, means for precluding movement of said first engaging member, a second engaging member movably mounted on the driven member, means for holding the second engaging member from engagement with the toothed driving member, means for releasing said precluding means to allow said urging means to move the first engaging member into engagement with a tooth on the driving member whereby the momentum of the driving member is transmitted to the first engaging member to move the actuator, and means on the actuator for engaging and moving the second engaging member against the effect of its holding means into full engagement with another tooth on the toothed driving member.

5. In a positive engaging clutch, a driving drum having formed along the inner peripheral surface a plurality of teeth, a driven member, an actuator slidably mounted on the driven member, a first pawl pivotally mounted on the actuator, a second pawl pivotally mounted on the driven member, means for pivoting the first pawl into engagement with one of the teeth formed on the driving drum whereby the inertia of the driven member causes the actuator to slide relative to the driven member, and means connected to the actuator for moving the second pawl into engagement with another one of the teeth formed on driving member upon completion of a predetermined sliding movement of the actuator.

6. In a positive engaging clutch, a driving member having teeth formed thereon, a driven member, an actuator movably mounted on the driven member, a first engaging member movably mounted on the actuator, a second engaging member movably mounted on the driven member, means for urging the first engaging member toward the teeth of the driving member, means for retaining the first engaging member out of engagement with the teeth, means for urging the second engaging member out of engagement with the teeth, means for releasing the retaining means to allow the first engaging member to engage one of the teeth, said driven member having sufficient inertia to cause said first engaging member to move the actuator relative to the driven member, and means on the actuator for engaging and moving the second engaging means into engagement with another one of the teeth on the driving member.

7. In a positive engaging clutch, a toothed driving member having a plurality of teeth formed thereon, a driven member, an actuator movably mounted on the driven member, means for urging the first engaging means into engagement with a tooth of the driving member, a second engaging member movably mounted on the driven member, means for urging the second engaging member out of engagement with the toothed driving member, means on the actuator for holding the second engaging member in engagement with a tooth on the driving member against the effect of its urging means, and means for moving the first engaging member out of engagement with its engaged tooth, said urging means of the first engaging member being rendered effective to move said first engaging means, said actuator, and said holding means to allow said urging means to disengage the second engaging member.

8. In a positive engaging clutch, a multi-toothed driving member, a driven member, an actuator slidably mounted on the driven member, a first pawl pivotally mounted on the actuator, a second pawl pivotally mounted on the driven member, a first resilient means for urging said first pawl to pivot into engagement with said toothed driving member, said first resilient means also urging said actuator through the first pawl to move in a predetermined direction, means for restraining the movement of the first pawl to hold the first pawl and actuator in an unoperated position, resilient means for holding the second pawl out of engagement with the toothed driving member, means for releasing the restraining means to allow the first pawl to pivot into engagement with a tooth on the driving member whereby the momentum of the driving member upon engagement is sufficient to slide the actuator in a direction opposite to the force applied to the actuator by the first resilient means, and means carried by the actuator for engaging and pivoting the second pawl into the full depth between two adjoining teeth on the driving member whereby continued movement of the driving member causes the second pawl to be engaged by a tooth on the driving member to transfer the driving connection between the clutch elements from the first pawl to the second pawl.

9. In a positive engaging clutch, a driving member, a driven member, a first engaging member movably mounted on the driven member, a second engaging member movably mounted on the driven member, means controlled by the engagement of the first engaging member with the driving member for holding the second engaging member in engagement with the driving member, means for disengaging the first engaging member whereby the holding means for the second engaging member is rendered ineffective, and means for disengaging the second engaging means upon the holding means being rendered ineffective.

10. In a positive engaging clutch, a multi-toothed driving member, a driven member, a first engaging member movably mounted on said driven member, means for urging said first engaging member into engagement with a tooth of the driving member, a second engaging member movably connected to the driven member, means for urging the second engaging member out of engagement with said toothed driving member, means controlled by the first engaging member for holding the second engaging member in full engagement with another of the teeth of the driving member, and means for moving the first engaging member out of engagement whereby the urging means of the first engaging member is rendered effective to render ineffective the holding means for the second engaging member to disengage said second engaging member.

11. In a positive engaging clutch, a multi-toothed driving member, a driven member, an actuator slidably mounted on the driven member, a first pawl pivotally mounted on the actuator, resilient means connected to the pawl for urging the pawl into engagement with the toothed driving member, said resilient means also urging said actuator to slide in a predetermined direction, means for holding the first pawl out of engagement with the driving member, a second pawl pivotally mounted on the driven member, resilient means for urging said second pawl out of engagement with the toothed driving member, means for releasing the holding means to allow the first pawl to pivot into engagement with a tooth on the driving member, said driving member having sufficient momentum to move the slidable actuator in a direction opposite to that urged by the resilient means connected to the first pawl, a detent on the slide for engaging and pivoting the second pawl into full engagement with another tooth on the driving member, and means for engaging the releasing means to pivot the first pawl out of engagement with the tooth on the driving member, said urging means of the first pawl being rendered effective to move the slide in the predetermined direction to move the detent out of engagement with the second pawl whereupon the resilient urging means connected to the second pawl pivots the second pawl out of engagement with the tooth on the driving member.

12. In a clutch having a driving means and a driven means, means for clutching together the driving and driven means, said clutching means comprising a first engaging element movably mounted between the driving and driven means, a second engaging element movably mounted between the driving and driven means, means for moving the first engaging element into position to clutch together the driving and driven means, and means operated by the first engaging element in the clutching position for moving the second engaging element into position to clutch together the driving and driven means.

13. In a device for clutching together a driving means and a driven means, a first engaging element mounted for pivotal and translatory movement, a second engaging element movably mounted with respect to the driving and driven means, means for pivoting the first engaging element into a position to clutch together the driving and driven means, said clutching action imparting a translatory movement to the first engaging element, and means operated by the translatory movement of the first engaging element for moving the second engaging element into a position to clutch together the driving and driven means.

14. In an engaging unit adapted to clutch together a driving means and a driven means, a first engaging element mounted for pivotal and translatory movement, a second engaging element mounted for pivotal movement, means for pivoting the first element to clutch together said driving and driven elements, said clutching together of the driving and driven means being effective to impart a translatory movement to the first engaging element, and means connected to the first engaging element for pivoting the second engaging element to clutch together said driving and driven means, said last named means being rendered effective upon translatory movement being imparted to the first engaging element.

WALTER J. ZENNER.

References Cited in the file of this patent

UNITED STATES PATENTS

| Number | Name | Date |
|---|---|---|
| 1,737,907 | Arnold | Dec. 3, 1929 |
| 2,202,402 | Rueb | May 28, 1940 |
| 2,407,558 | Kress | Sept. 10, 1946 |
| 2,577,199 | Klopner | Dec. 4, 1951 |
| 2,627,945 | Hooker | Feb. 10, 1953 |